（12) United States Patent
Liu et al.

(10) Patent No.: US 7,236,700 B1
(45) Date of Patent: Jun. 26, 2007

(54) SCALABLE AND EXCHANGEABLE ERBIUM DOPED FIBER AMPLIFIER FOR DWDM

(75) Inventors: Jian Liu, Mountain View, CA (US);
Zheng Wang, San Jose, CA (US);
Xuejun Lu, Fremont, CA (US);
Yonglin Huang, Milpitas, CA (US)

(73) Assignee: Finisar Corporation, Sunnyvale, CA (US)

( * ) Notice: Subject to any disclaimer, the term of this patent is extended or adjusted under 35 U.S.C. 154(b) by 99 days.

(21) Appl. No.: 10/269,176

(22) Filed: Oct. 11, 2002

(51) Int. Cl.
*H04J 14/06* (2006.01)

(52) U.S. Cl. ...................................... 398/61

(58) Field of Classification Search ........... 359/341.41, 359/341.43, 341.3, 337; 398/61
See application file for complete search history.

(56) References Cited

U.S. PATENT DOCUMENTS

| 5,396,358 | A | * | 3/1995 | Van Deventer | 398/61 |
| 6,101,423 | A | * | 8/2000 | Csipkes et al. | 700/117 |
| 6,134,047 | A | * | 10/2000 | Flood et al. | 359/337.12 |
| 6,166,851 | A | * | 12/2000 | Flintham et al. | 359/337.2 |
| 6,215,581 | B1 | * | 4/2001 | Yadlowsky | 359/337 |
| 6,424,457 | B1 | * | 7/2002 | Koonmen et al. | 359/337.1 |
| 6,522,460 | B2 | * | 2/2003 | Bonnedal et al. | 359/341.42 |
| 6,563,629 | B2 | * | 5/2003 | Ghera et al. | 359/337.1 |
| 6,731,424 | B1 | * | 5/2004 | Wu | 359/337.1 |
| 2004/0085624 | A1 | * | 5/2004 | Liu et al. | 359/341.3 |

OTHER PUBLICATIONS

Becker et al. Erbium-Doped Fiber Amplifiers Fundamentals and Technology. Academic Press. 1999. pp. 251-304.*
Bell Labs Technical Journal, Jan.-Mar. 1999—"Optical Fiber Amplifiers for WDM Optical Networks;" Authors: Yan Sun, Atul K. Srivastava, Jianhui Zhou, James W. Sulhoff.
IEEE Photonics Technology Letters, vol. 11, No. 10, Oct. 1999—"Dynamic Erbium-Doped Fiber Amplifier Based on Active Gain Flattening with Fiber Acoustooptic Tunable Filters;" Authors: Seok Hyun Yun, Bong Wan Lee, Hyang Kyun Kim, Byoung Yoon Kim.

* cited by examiner

*Primary Examiner*—Deandra M. Hughes
(74) *Attorney, Agent, or Firm*—Workman Nydegger

(57) ABSTRACT

Erbium doped fiber amplifiers for dense wavelength division multiplexed (DWDM) metro area optical networks may be configured as either high gain amplifiers or power amplifiers. The erbium doped fiber type, length, and pump power level are selected so that the shape of the gain spectra is approximately the same for single channel or multi-channel operation. In one embodiment, the same erbium doped fiber type and length is used for both power amplifiers and high gain amplifiers, reducing manufacturing costs.

2 Claims, 6 Drawing Sheets

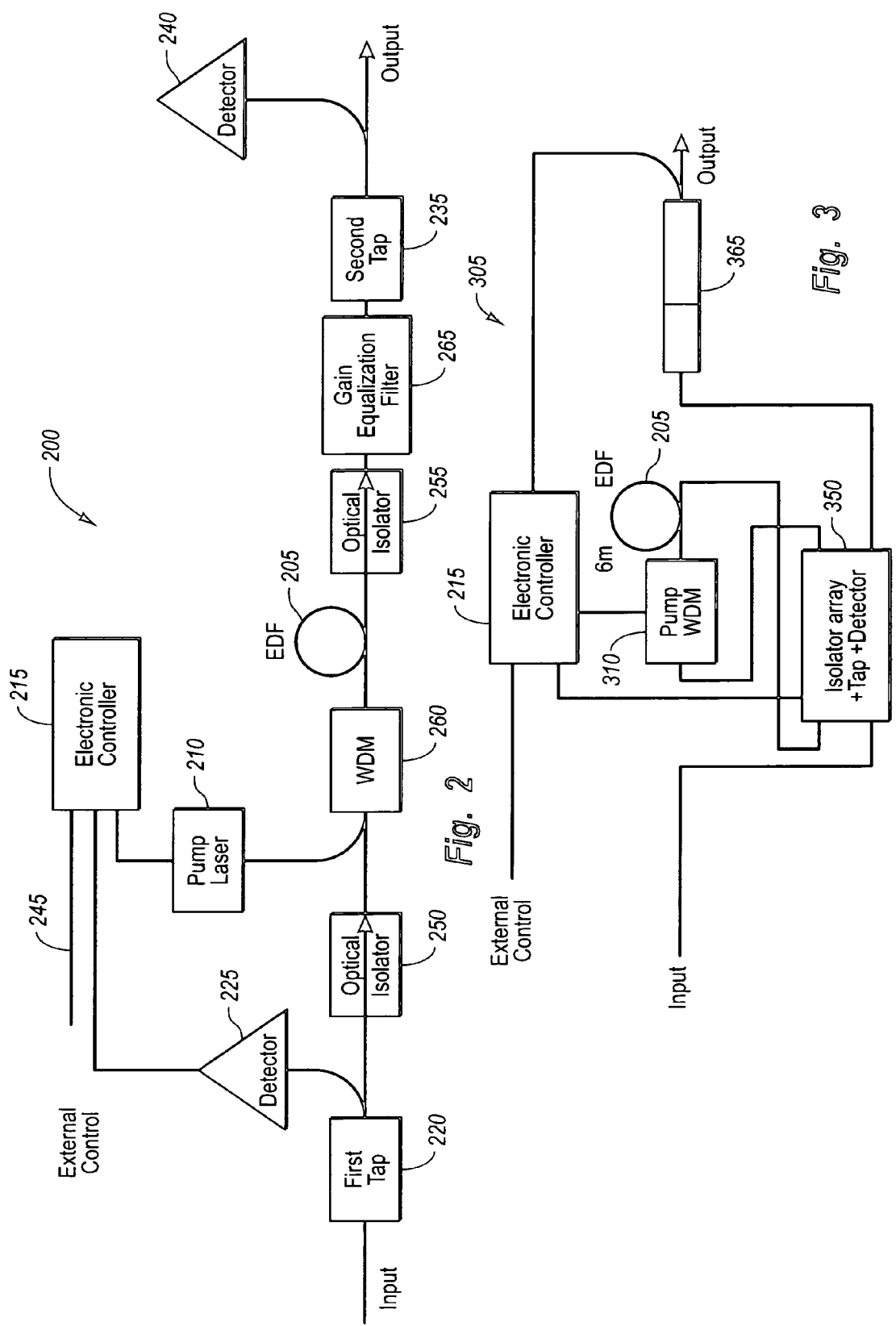

SCALABLE AND EXCHANGEABLE ERBIUM DOPED FIBER AMPLIFIER FOR DWDM

BACKGROUND OF THE INVENTION

1. Field of the Invention

The present invention relates generally to erbium doped fiber amplifiers for optical networks, particularly dense wavelength multiplexed networks.

2. Description of Background Art

Dense wavelength multiplexed (DWDM) networks are of interest for a variety of applications. Conventionally, for example, optical multiplexers with a low insertion loss are used to multiplex wavelength channels, resulting in a high cost for each optical multiplexer. Erbium doped fiber amplifiers (EDFAs) are commonly used to amplify bands of wavelength channels. For example, a single EDFA may be configured to provide power amplification for a band consisting of a few closely spaced wavelength channels (e.g., 3–5). Alternatively a single EDFA may be configured to provide high gain at low power levels. Consequently, a conventional DWDM network may use several different types of EDFA amplifiers, such as pre-amplifiers, post-amplifiers, and EDFAs for providing amplification to a small number of wavelength channels.

The component cost of DWDM networks is greater than desired, particularly for DWDM networks designed to accommodate 20 or more wavelength channels. Conventionally, low-insertion loss optical multiplexers are required along with a substantial number of EDFAs of different types. As result, the component cost is greater is greater than desired for many applications.

What is desired is a DWDM network with reduced component cost.

SUMMARY OF THE INVENTION

The present invention generally comprises Erbium Doped Fiber Amplifiers (EDFAs) for use in an optical network. The EDFAs include an erbium doped fiber (EDF), a pump laser, a controller to regulate the pump laser, and a gain equalization filter. The EDF type, length, and pumping level is selected to facilitate a scalable design in which the number of wavelength channels may vary from one to a maximum number, such as 40 channels within the C band. In one embodiment, a fixed EDF length is selected for both high gain amplifiers and power amplifiers, which permits a compatible manufacturing process to be used to fabricate both pre-amplifiers and post-amplifiers. In this embodiment, the pump power level is selected to be at a first pump power level for high gain amplifiers and at a second, higher pump power level for high gain amplifiers. One application of the EDFAs is in a metro area network in which a power amplifier is used as a postamplifer to compensate for the losses of a lossy optical combiner and a high gain amplifier is used as a preamplifier to compensate for span losses and DWDM loss.

BRIEF DESCRIPTION OF THE DRAWINGS

FIG. 2 is a block diagram of one embodiment of an EDFA of the present invention.

FIG. 3 is a block diagram of one embodiment of an EDFA of the present invention.

The figures depict a preferred embodiment of the present invention for purposes of illustration only. One of skill in the art will readily recognize from the following discussion that alternative embodiments of the structures and methods disclosed herein may be employed without departing from the principles of the claimed invention.

DETAILED DESCRIPTION OF THE PREFERRED EMBODIMENTS

Figure 1:
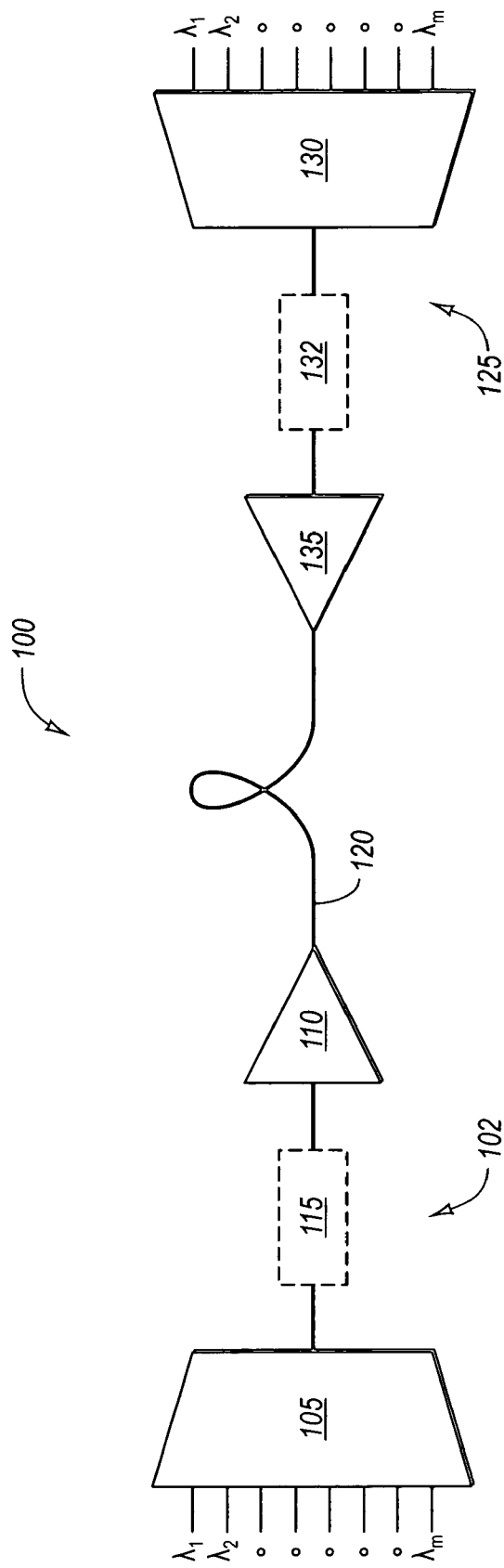
FIG. 1 is a block diagram of an exemplary optical network in accord with the present invention.

The present invention generally comprises broadband erbium doped fiber amplifiers (EDFAs) for use in an optical network, such as a dense wavelength division multiplexed (DWDM) network. FIG. 1 illustrates an exemplary optical network 100 of the present illustrating how the use of power broadband EDFAs and high gain EDFAs faciltate DWDM network design, such as in a metropolitan ("metro") area network. At a source node 102 an optical combiner (e.g., a multiplexer system) 105 is configured to accept a plurality of different optical wavelength channels from optical transmitters (not shown) and multiplex the wavelength channels onto an optical fiber. In some embodiments, the multiplexed wavelength channels are amplified in a power EDFA 110 to at least compensate for the optical losses 115 associated with the optical combiner, although it may also be used to improve the signal to noise ratio of the network. For example, if the optical combiner 105 utilizes star couplers it may have an insertion loss of 3 dB or greater for each stage of optical star couplers used in the optical combiner (e.g., 12 dB or more of loss if four stages of star couplers are used). Thus, a power EDFA 110 may be included as a post-amplifier to compensate for the optical losses of optical combiner 105, thereby permitting a comparatively a high-loss optical combiner, such as a star coupler, to be utilized to multiplex wavelength channels.

The wavelength channels travel along an optical fiber 120 to a receiving node 125. At the receiving node an optical demultiplexer 130 is configured to separate out (demultiplex) individual wavelength channels. The optical demultiplexer 130 has optical losses 132 associated with separating wavelength channels for individual receivers (not shown). In one embodiment, a high optical gain EDFA 135 is disposed prior to the input of the optical demultiplexer 130 to act as a pre-amplifier and has a power optical gain sufficient to at least compensate for optical losses associated with the optical fiber 120, the demultiplexer 130, and other losses. If the optical gain of EDFA 135 is sufficiently high, EDFA 135 can provide sufficient optical gain to compensate for an optical demultiplexer having comparatively high losses. For example, if the optical fiber has a loss of about 30 dB, an optical gain for EDFA 135 of about 25 dB may be sufficient to compensate for the fiber span loss, the loss associated with the demultiplexer 130, and other losses.

One aspect of optical network 100 is that two types of broadband EDFAs may be required depending upon the span loss associated with the optical fiber. A power broadband optical EDFA 110 may be required to compensate for optical losses 115 prior to transmission on optical fiber 120. Additionally, a high optical gain broadband EDFA 135 may be required having sufficient gain to boost the signal strength of the wavelength channels received from the optical fiber to an acceptable level. For a network having a comparatively low span loss, a single high optical gain broadband preamplifier EDFA 135 at the receiving node may only be required to achieve an acceptable signal to noise ratio. However, for a network having a comparatively high span loss, both a power post-amplifier EDFA 110 at the transmitter node 102 and high gain preamplifier EDFA 135 at the receiving node 125 may be required to achieve an acceptable signal to noise ratio.

The EDFAs 110 and 135 are preferably broadband optical amplifiers for amplifying a large number of wavelength channels, e.g., 20 or more wavelength channels, since this reduces the number of EDFAs required in network 100. Additionally, the cost to manufacture the EDFAs may be reduced if the two types of EDFAs 110 and 135 utilize a compatible low component count manufacturing process, e.g., a manufacturing process that can be performed on a single manufacturing line with minimal variation in the components required for the postamplifier EDFAs 110 and preamplifier EDFAs 135.

FIG. 2 is a block diagram illustrating one embodiment of an EDFA of the present invention that may be adapted as either a power postamplifier or high gain preamplifier. A segment of erbium doped fiber (EDF) 205 provides optical amplification. EDF 205 preferably comprises a broadband EDF. One example of a broadband EDF is the Lucent GP-980 Erbium-Doped Fiber sold by the Speciality Photonics Division of OFS, of Somerset, N.J. The GP-980 EDF has a high erbium concentration while aluminum co-doping maintains good efficiency and spectral flatness over the C-Band (1530–1565 nanometers). EDFs such as the GP-980 may be purchased in pre-selected fiber lengths or in spools. OFS also provides an Optical Amplifier Simulation System (OASiX), which models the performance of erbium-doped fiber in design simulations. In one embodiment, EDF 205 is a segment of GP-980 fiber approximately six meters in length.

EDF 205 has an input end for receiving light at a pump laser wavelength (e.g., 980 nanometers) from a pump laser 210 and DWDM wavelengths coupled from an input via a multiplexer 260. The pump power level of the pump laser 210 is regulated by an electronic controller 215, which may set a target pump power level. In one embodiment, the input power level of input wavelength channels is measured using a first tap 220 and first optical detector 225 while the output power level of the amplifier is measured using a second tap 235 and detector 240. Measurements of input power level and output power level are used by controller 215 to make fine adjustments to the pump power level to stabilize the amplifier response using conventional control techniques. An additional external control input 245 may be used to provide commands for turning on/off the pump laser or setting a target pump power level. First and second optical isolators 250 and 255 provide optical isolation between components.

It is desirable that an EDFA provide substantially flatband amplification, e.g., substantially equal amplification for different wavelength channels. However, an EDF has an optical gain spectra that is a function of wavelength and pump power level. Additionally, the optical gain spectra of an EDF also depends upon the input power spectra and power level in each wavelength channel. Consequently, the output of EDF 205 from its output end is coupled to a gain equalization filter (GEF) 265, preferably through an intermediate optical isolator 255.

GEF 265 has a spectral loss/transmission profile selected to flatten the optical gain of EDF 205. GEF 265 equalizes the signal power for multiple channels over a wide spectral bandwidth. GEFs may be implemented as optical filters having transmission/loss characteristics selected to flatten the effective gain or as dynamically tunable components whose spectral loss is controllable, such as tunable array waveguides, micro-electronic mirror system, or acoustic-optical filters. The effective loss characteristics of GEF 265 thus have approximately the same relative variation with wavelength as the gain of the EDF (aside from a level shift) such that the EDF flattens the gain variations, e.g., if the EDF gain has a peak at one wavelength, the GEF has a peak in loss at about the same wavelength that functions to flatten the effective gain. It will be understood that the loss characteristic of a GEF 265 for a pre-amplifier are typically different than those of a power amplifier.

FIG. 3 shows an alternate embodiment of an EDFA 305 in which several of the components of EDFA 200 have been integrated as sub-modules that may be coupled together with optical fiber pigtails, reducing the number of components that have to be packaged and the total size of the EDFA. Each sub-module may, for example, comprise an optical assembly of discrete optical components although it will be understood that photonic integrated circuit techniques may be used to integrate some or all of the components in a sub-module. Examples of the components that can be integrated into sub-modules include GEFs, multiplexing filters, filter-type taps, optical detector, and dual port optical isolator arrays. In the embodiment shown in FIG. 3, element 365 is a packaged module integrating a GEF, tap, and detector. Element 350 integrates an isolator, tap, and detector. Element 310 is packaged module integrating a 980 pump laser and a multiplexer.

In one embodiment of the present invention, both power EDFAs and high gain EDFAs utilize an EDF that has the same optical characteristics (e.g., fiber of the same commercial type having substantially identical doping characteristics and waveguiding properties) and also having the same length. This provides important manufacturing benefits. An EDF more than a few meters in length is commonly wound into a coil to save space. For example, an EDF having a substantial length may be wound on a compact spool. However, there are limitations on the bend radius and winding tension of a particular type of EDF. Changing the EDF type or length may require changes in package design, spool design, winding tension, or other aspects of the manufacturing process. Conversely, utilizing a single EDF type and length for both types of amplifiers permits a single package design and manufacturing line to be used.

The EDF length, optical pump power level, and GEF loss characteristics (optical attenuation versus wavelength) may be selected empirically or by using a computer simulation, such as OASiX, to determine an EDF fiber type and fiber length capable of providing both power gain and high gain. Computer simulations, such as OASix, model the optical gain throughout an EDF as a function of wavelength, pump power level, EDF length, EDF type (e.g., doping concentration), the input power level of wavelength channels, and model the effects of gain saturation.

In one embodiment, the EDF type, length, and pump power is selected so that the gain spectra of the EDF has substantially the same shape for single channel and multichannel operation range (e.g., from one channel to a maximum number of channels, such as 40 channels). This permits a scalable amplifier design in which the number of channels can be varied by an end user. Additionally, if the gain shape does not substantially change with the number of wavelength channels (aside from a level shift), an appropriate GEF loss spectra can be selected to achieve a nearly flat gain profile for single channel or multichannel operation. For a high gain pre-amplifier the gain spectra preferably has a comparatively high minimum threshold gain over an extended wavelength range (e.g., the C band of 1530 to 1565 nanometers) and which doesn't substantially change much as the number of channels increases for wavelength channels having a low input power level. For a power post-amplifier, the gain spectra preferably has some minimum power gain per channel over the extended wavelength range regardless of whether a single wavelength channel is used or multiple channels. Additionally, for a power amplifier the profile of the gain spectra preferably has approximately the same shape whether in single channel or multi-channel operation.

Figure 4:
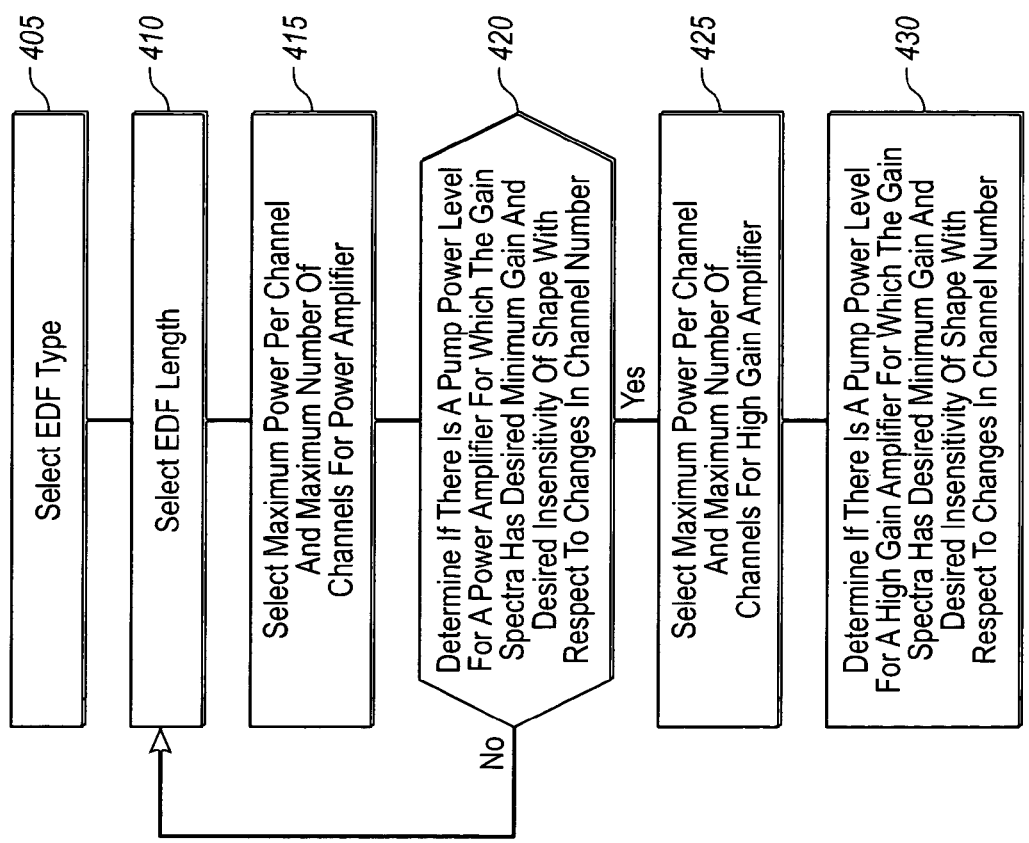
FIG. 4 is a flow chart illustrating a method of selecting an EDF length and pump power levels for power or high gain operation.

FIG. 4 is a flow chart illustrating a method of designing an EDFA of the present invention. The type of EDF is selected 405. An initial EDF length is then selected 410. For a power amplifier, a maximum power per channel and maximum number of channels is selected 415. The pump power level is varied to determine 420 if there is a pump power level for which the gain spectra has a minimum threshold power gain for all conditions and an acceptably variance in profile. For example, the gain spectra may be simulated for single channel, multi-channel, and the maximum number of channels to verify that the gain spectra remains above a minimum value and retains substantially the same shape as the channel number is varied from one channel to the maximum number of channels. For a power amplifier, the shape of the gain spectra should remain sufficiently the same such that a that single GEF can flatten the gain over the full range of channel numbers employed by an end user. If there is no possible solution, the EDF fiber length or type may be varied. Otherwise, a similar process is repeated for a high gain amplifier. A maximum number of channels and a maximum power per channel is selected 425. The pump power is then varied to determine 430 if there is a pump power for which the EDF has a gain spectra that has, a desired minimum threshold gain for a high gain amplifier and which is comparatively insensitive to changes in shape as the channel number is varied from one channel to a maximum number of channels.

Figure 5:
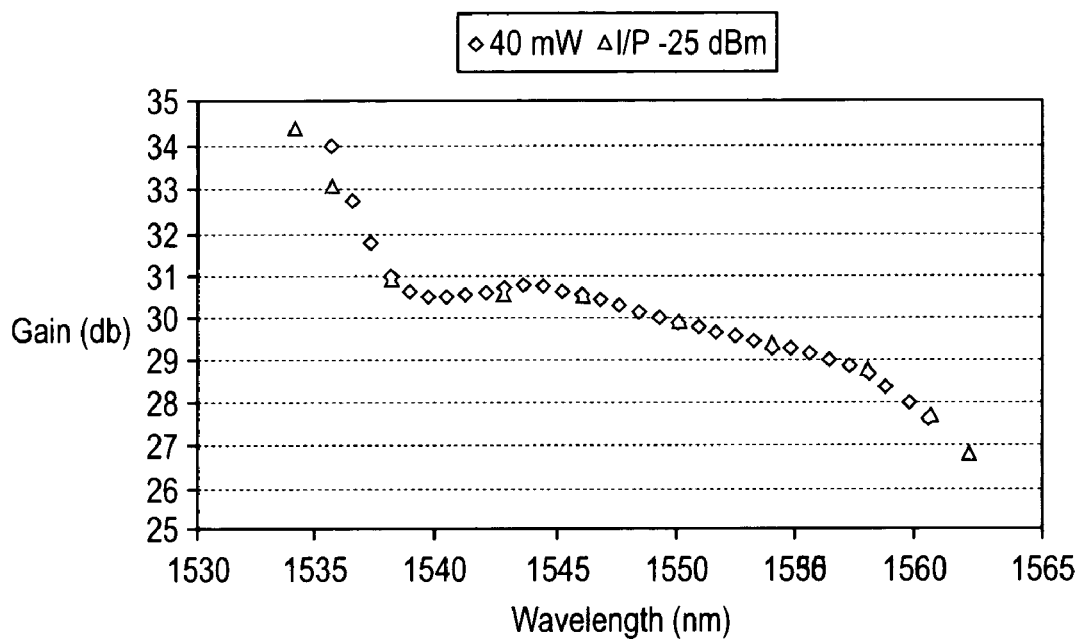
FIG. 5 is a graph showing a simulation of gain in an EDF for single channel and multi-channel operation for a high gain amplifier.

FIG. 5 is a graph illustrating a simulation of the gain of an EDF for a GP 980 fiber pumped at a sufficient level for a high gain amplifier. In the simulation the amplifier is designed as a pre-ampliifer having a gain greater than 25 dB and a power amplifier having a gain larger than 16 dB. An EDF length of six meters was selected. For a high gain EDFA used as a pre-amplifier, a pump power level of 40 mW was selected. The gain profile of the EDF is shown for a single input channel at a power of −25 dBm, as indicated by the triangle-shapes. Additionally, simulations were performed for 32 input channels at −40 dBm/ch, as indicated by the diamond shapes. The gain shape is approximately the same as for a single wavelength channel, and is greater than 25 dB at all wavelengths such that a GEF may be used to flatten the gain to about 25 dB for all of the channels. Other simulations indicate that an EDF used as a pre-amplifier may be pumped at a level having substantially the same gain profile regardless of the number of channels for 40 or more channels over the entire C band. Consequently, by selecting a suitable EDF type, length, and pump power, a preamplifier of the present invention may be designed to have substantially flat, uniform gain of about 25 dB for from one to 40 or more channels. This facilitates a scalable design in which an end user may vary the wavelength channels utilized in the network from one channel to up to a maximum number, such as 40 channels.

Figure 6:
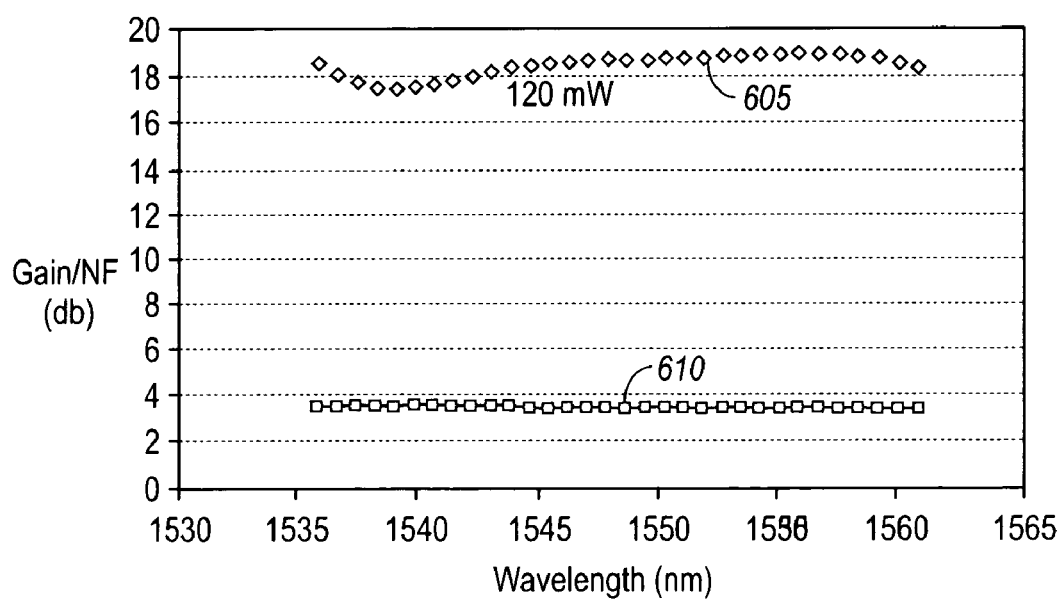
FIG. 6 is a graph showing a simulation of gain in an EDF for single channel and multi-channel operation for a power amplifier.

FIG. 6 is a graph of a simulation of the gain of a GP 980 EDF having a length of six meters as in the example of FIG. 5. However, here the pump power level is raised to 120 mW. The input signal power level is set at −15 dBm/ch. Plot 605 illustrates the gain spectrum and plot 610 illustrates a noise figure. The gain is over 16 dB and the gain shapes are similar for various input channel counts.

Figure 7:
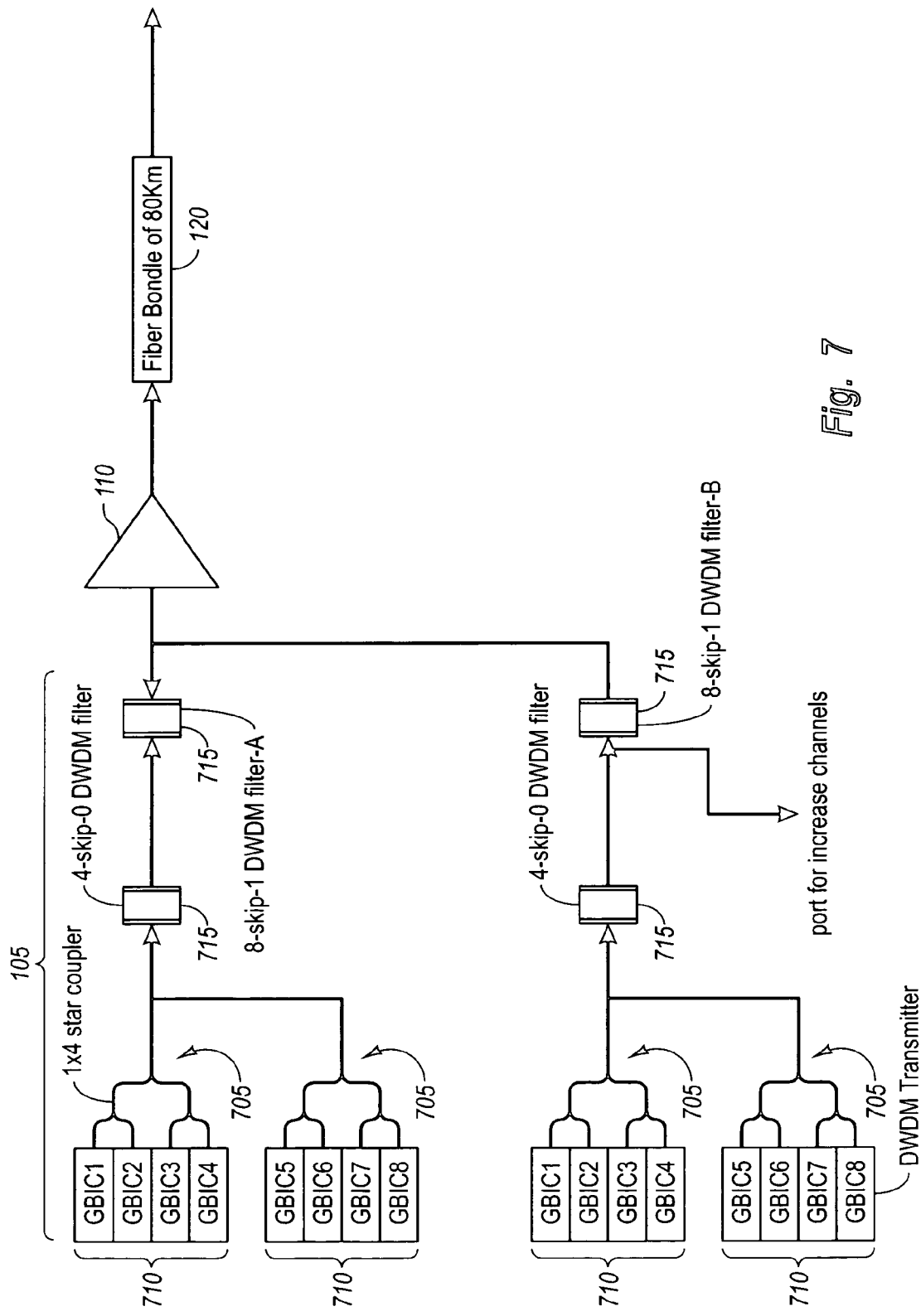
FIG. 7 illustrates a transmitter node portion of an optical network.
Figure 8:
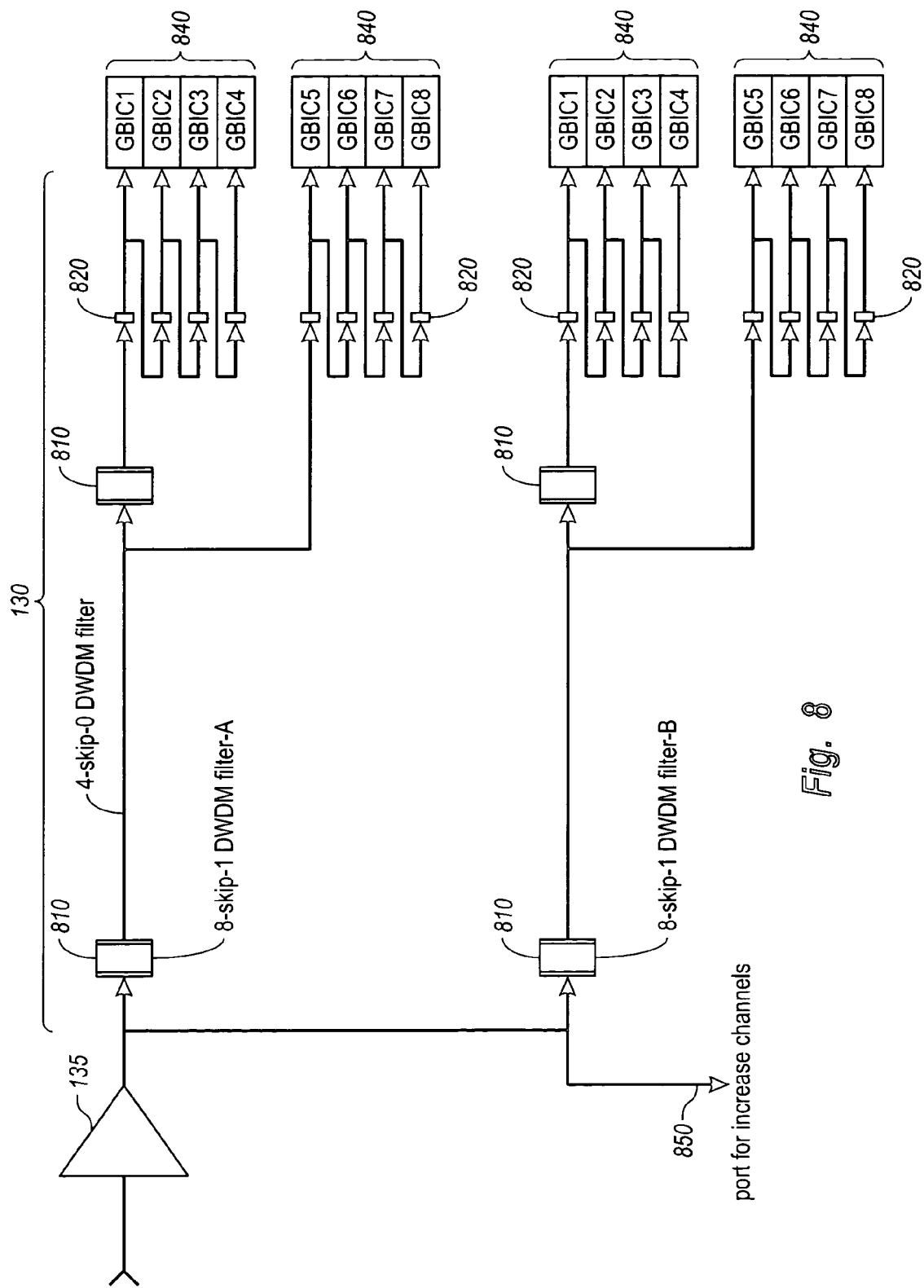
FIG. 8 illustrates a receiver node portion of an optical network.

One application of the EDFAs of the present invention is in metro area networks, such as datacom networks. FIG. 7 illustrated a transmitter node of a metro area network. In this embodiment, the optical combiner 105 at a transmitter node may be implemented using star couplers 705 to multiplex light of different wavelength channels, such as light from a plurality of gigabit interface converter interface (GBIC) transmitters 710. Passband "skip" filters 715, such as thin film interference filters, may be included after the star couplers to increase channel isolation and stability. A power amplifier 110 of the present invention may be used as a post-amplifier to compensate for the losses of the star couplers, with in one embodiment the power gain being select to at least compensate for the star coupler losses, with the multi-stage star losses being approximately: loss=m(3 dB), where m is the number of star coupler stages. For an optical combiner with four stages of star couplers, the cumulative insertion loss is at least about 12 dB, such that a power gain of at least about 12 dB may be required, with a power gain of at least about 15 dB being preferred for a DWDM network with up to 40 channels in the C-band. For metro applications, an optical fiber span 120 of 50–100 km in length may be used having a corresponding attenuation of about 20 dB. As shown in FIG. 8, at a receiving node a high gain amplifier 135 of the present invention may be used as a pre-amplifier to compensate for the fiber losses. Skip filters 810 and wavelength channel filters 820 may be used to demultiplex the optical wavelength channels and guide the light to suitable GBIC receivers 840. Ports 850 in the transmitter node and the receiver node may be included to permit additional wavelength channels to be accommodated as required, permitting the number of wavelength channels to be increased. Amplifier 135 preferably has a gain of about 20 dB or more for metro area networks having a high span loss. It will be understood in FIGS. 7–8 that some embodiments of an optical network in accord with the present invention may only require one amplifier, e.g., only a pre-amplifier or a post-amplifier, depending upon the losses of the optical combiner 105, span losses, and losses of the optical demultiplexer.

One benefit of the EDFA of the present invention is that it facilitates a scalable network in which a user may vary their choice of wavelength channels used in the optical network. In some embodiments, the EDFA may accept up to 40 wavelength channels. Appropriate selection of EDF type, length, and pump power level permits broadband amplification, such as amplification over a substantial portion of the C-band.

Another benefit of the EDFA of the present invention is that it that both power and high gain EDFAs may be manufactured using a compatible manufacturing process. Both amplifiers may use the same type and length of EDF. Only the pump power level and GEF spectral characteristics need to be varied to change the design from a power EDFA to a high gain EDFA. The pump power level can be set via an electronic controller whereas GEFs with different loss characteristics.

Still another benefit of the network design of the present invention is that it permits comparatively lossy optical combiner and demultiplexers to be used, reducing network component costs. In some embodiments, a power EDFA compensates for the optical loss of star couplers. In other embodiments, a high gain EDFA compensate for the optical loss of demultiplexer comprised of skip filters.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. An optical system, comprising:
  an optical multiplexer having at least four stages of star coupler having a cumulative insertion loss of at least 12 dB to combine a plurality of wavelength channels;
  a power amplifier having an erbium doped fiber with a fixed length, the power amplifier being coupled to an output of the optical multiplexer for compensating for at least part of an optical loss associated with the at least four stages of star coupler, wherein the power amplifier has a gain of at least 15 dB; and
  a high gain amplifier having an erbium doped fiber with a fixed length, the high gain amplifier receiving multiplexed wavelength channels via an optical fiber, the gain selected to compensate for at least part of an optical loss associated with the optical fiber, wherein the erbium doped fiber of the power amplifier has substantially the same fixed length as the erbium doped fiber of the high gain amplifier;
  the power amplifier and the high gain amplifier each having a substantially flat gain spectrum over the plurality of wavelength channels in the C-band.

2. The optical system of claim 1, wherein the optical fiber has an optical loss greater than 20 dB and the high gain amplifier has an optical gain greater than 20 dB.

* * * * *